Figure 1:
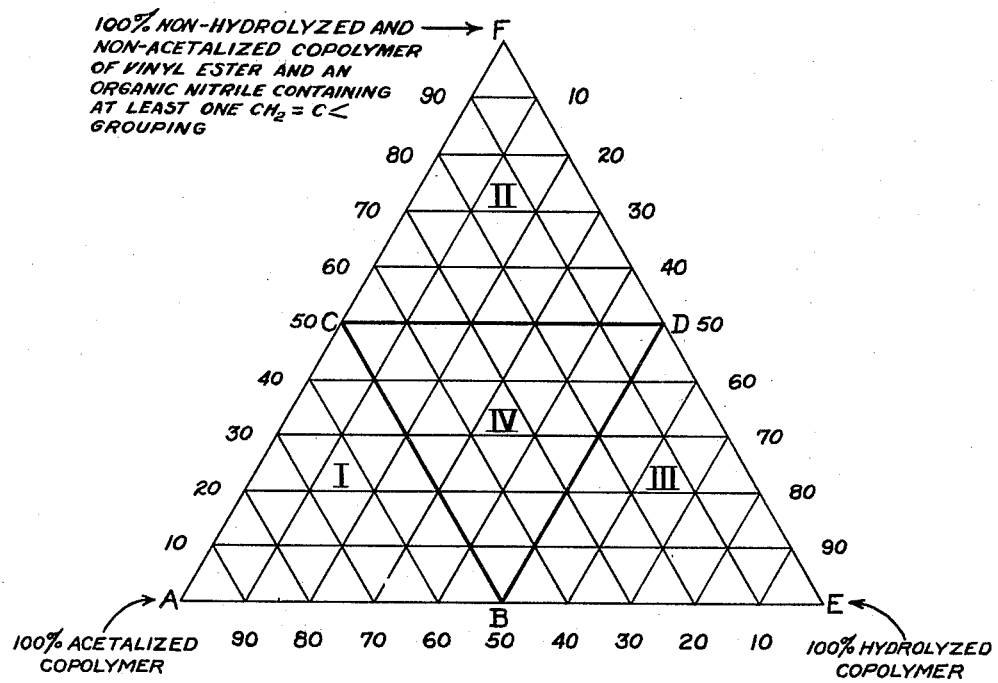

Inventor:
Gaetano F. D'Alelio,
by Harry E. Dunham
His Attorney.

UNITED STATES PATENT OFFICE 2,332,899

SYNTHETIC COMPOSITION COMPRISING HYDROLYZED, ACETALIZED, AND/OR KETALIZED COPOLYMERS OF VINYL ESTERS AND ORGANIC NITRILES CONTAINING AT LEAST ONE $CH_2=C\big\langle$ GROUPING Gaetano F. D'Alelio, Pittsfield, Mass., assignor to General Electric Company, a corporation of New York Application July 10, 1940, Serial No. 344,743

19 Claims. (Cl. 174—125)

This invention relates to the production of new materials having valuable and characteristic properties that make them especially suitable for use in industry, for example in molding, laminating, coating and adhesive applications, and for other purposes. The invention is concerned more particularly with the production of compositions of matter comprising an acetalized, a ketalized or an acetalized and ketalized copolymer (or copolymers) of a plurality of copolymerizable materials, one of which is a vinyl ester and another of which is an organic nitrile copolymerizable with the said ester. The vinyl esters and organic nitriles used in carrying the present invention into effect have at least one

grouping. The vinyl ester and the organic nitrile each may have only one

grouping, or each may have a plurality of polymerizable groupings. The present invention provides new and useful compositions comprising the product of conjoint hydrolysis and acetalization, ketalization or acetalization and ketalization of a copolymer of a vinyl ester having at least one

grouping and an organic nitrile containing either a single or a plurality of polymerizable groupings, for example one or more

groupings. In producing these new compositions, the mixed copolymerizable materials may be partially or completely copolymerized prior to conjoint hydrolysis and acetalization, ketalization or acetalization and ketalization.

It has been suggested heretofore that synthetic compositions may be prepared by partially hydrolyzing (saponifying) a mixed polymerization product of two different vinyl esters (or a vinyl ester and an ester of acrylic acid), each of said esters having one

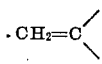

grouping, and reacting the partially hydrolyzed product with an aldehyde or a ketone to introduce acetal or ketal groups into the product. In such acetalized or ketalized products only the acid portion of one of the esters is removed in part. As a result, such treated copolymers are potentially hydrolyzable. Hydrolysis of the acetalized or ketalized copolymer during service use of the material would be harmful in many cases, for example where the product is in contact with metals, as the acid liberated by the hydrolysis would pit and corrode the metal surfaces. This danger of acid formation is even greater if an acrylic ester constitutes a component of the copolymer reactant.

Taking vinyl acetate and methyl acrylate as illustrative of the compounds previously suggested as suitable for forming a copolymer that subsequently may be acetalized, the following structural formulas illustrate the steps in the formation of the acetal derivative:

*Copolymer reactant before hydrolysis*

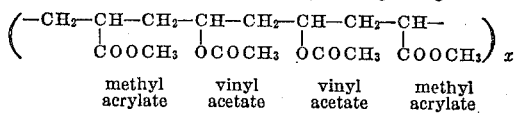

*After hydrolysis*

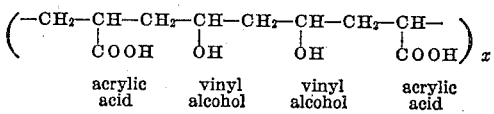

*After formalization*

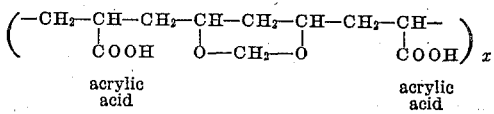

I have discovered that synthetic compositions which are different from, and in many respects superior to, organic artificial masses heretofore known can be produced by conjoint hydrolysis and acetalization, ketalization or acetalization and ketalization of a copolymer of a plurality of copolymerizable materials including at least one vinyl ester having at least one

grouping (e. g., vinyl formate, vinyl acetate, etc.) and at least one organic nitrile also having at least one polymerizable grouping, more particularly an organic nitrile containing at least one

grouping. Examples of such organic nitriles are acrylonitrile, CH₂=CH—CN, methacrylonitrile,

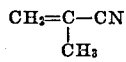

alpha chlor acrylonitrile,

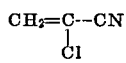

etc. The results of my research work indicate that upon simultaneously hydrolyzing and acetalizing, ketalizing or acetalizing and ketalizing a copolymer of a vinyl ester and an organic nitrile, each having at least one

grouping, the nitrile group is not hydrolyzed to the carboxyl group but, instead, reacts with the agent used for introducing acetal, ketal or acetal and ketal groups into the hydrolyzed copolymer. That this should happen was quite surprising and unpredictable.

If in producing the acetalized, ketalized or acetalized and ketalized copolymers with which this invention is concerned the nitrile group hydrolyzed to the carboxyl group, then the product obtained by acetalizing, ketalizing or acetalizing and ketalizing a copolymer of, say, vinyl acetate and acrylonitrile, should be the same as that obtained by simultaneously hydrolyzing and acetalizing, ketalizing or acetalizing and ketalizing a copolymer of vinyl acetate and an acrylic ester, e. g., methyl or ethyl acrylate. An acetalized, ketalized or acetalized and ketalized copolymer of vinyl acetate and an acrylic ester is readily soluble in acetic acid and usually (depending largely upon the particular

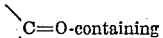

compound employed in its preparation) is a resin having a low softening point. In marked contrast, a copolymer of vinyl acetate and acrylonitrile when similarly acetalized, ketalized or acetalized and ketalized is considerably less soluble in acetic acid. Furthermore, it is usually a very hard, tough resin having a very high softening point. Thus it is seen that the acetalized, ketalized or acetalized and ketalized copolymers of this invention are different in kind from the acetalized, ketalized or acetalized and ketalized copolymers of a vinyl ester and an acrylic ester as evidenced by their differences in properties, and that an acrylonitrile is in no sense of the word the equivalent of an acrylic ester in producing these new synthetic compositions.

Although I do not definitely know the exact nature of the chemical reactions that take place upon conjoint hydrolysis and acetalization, ketalization or acetalization and ketalization of, a copolymer of a vinyl ester and a polymerizable nitrile, I believe that the reaction yields a product having a graphic formula of the general character shown below. For purpose of illustration, the copolymer reactant is shown as a copolymer of vinyl acetate and acrylonitrile.

*Copolymer reactant before conjoint hydrolysis and acetalization, specifically formalization*

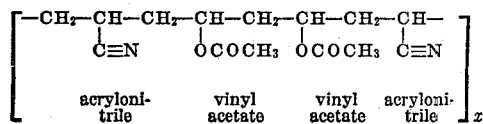

*After conjoint hydrolysis and formalization*

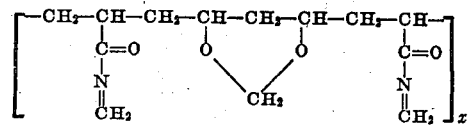

In forming a copolymer of, say, vinyl acetate and acrylonitrile, it is possible that cross-linkage may occur as a result of polymerization that may take place through the triple bond. However, it is doubtful if much of the acrylonitrile polymerizes in this way, since the copolymer of vinyl acetate and acrylonitrile is thermoplastic or semi-thermoplastic and it would not have such properties if any appreciable amount of the acrylonitrile caused cross-linkage to occur. Cross-linkage, therefore, can not alone be the cause of the increased flow point and solvent resistance of the acetalized copolymer. It is believed that the improved properties at least in part are obtained as a result of a reaction between the nitrile group of the organic nitrile-vinyl ester copolymer and the

organic compound used for introducing acetal, ketal or acetal and ketal groups into the hydrolyzed copolymer.

When a vinyl ester having at least one

grouping is copolymerized with an organic nitrile having a plurality of polymerizable groupings, cross-linkage takes place. Cross-linking also occurs when a vinyl ester having a plurality of polymerizable groupings is copolymerized with an organic nitrile having only one polymerizable grouping, e. g., one

CH₂=C⟨ grouping. By using such cross-linked copolymers as starting reactants, the properties of the final acetalized, ketalized or acetalized and ketalized product are further beneficially affected. This is due to the fact that the cross-linked copolymer imparts to the acetal, ketal or mixed acetal and ketal thereof the high impact strength and other desirable properties that characterize the starting copolymer reactant. It was quite surprising and unexpected to find that such cross-linked copolymers could be acetalized, ketalized or acetalized and ketalized, particularly in view of the fact that these materials are infusible and substantially insoluble in all ordinary solvents. I have also found that these acetalized, ketalized or acetalized and ketalized, cross-linked copolymers are sufficiently thermoplastic that, unlike the starting copolymer, they can be molded under heat and pressure to a desired shape. That cross-linked copolymers of vinyl esters and unsaturated organic nitriles would have this property, which may be described as "semi-thermoplasticity," was quite unexpected and unpredictable.

In carrying my invention into effect, I hydrolyze a copolymer of a vinyl ester having at least one

grouping and a material copolymerizable therewith comprising an unsaturated nitrile, more particularly an organic nitrile having at least one

grouping, and simultaneously with the hydrolysis reaction I cause the hydrolyzed copolymer to react with a substance comprising a

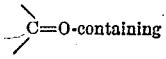

organic compound selected from the class consisting of aldehydes, ketones and mixtures of aldehydes and ketones until at least some of the hydroxyl groups have been replaced by the corresponding acetal, ketal or acetal and ketal groups. For example, I may hydrolyze the copolymer to at least 10 per cent, more particularly from 25 to 100 per cent of that theoretically possible and acetalize, ketalize or acetalize and ketalize the hydrolyzed copolymer until at least 10 per cent of the hydroxyl groups of the hydrolyzed copolymer have been replaced by the corresponding acetal, ketal or acetal and ketal groups. In some cases, for instance where resistance to water is of secondary consideration, the hydrolyzed copolymer may have only a minor proportion (that is, less than 50 per cent) of its hydroxyl groups replaced by acetal, ketal or acetal and ketal groups. For most applications, however, it is usually desirable that at least 50 per cent, say 60 to 100 per cent, of the hydroxyl groups of the hydrolyzed copolymer be replaced by acetal, ketal or acetal and ketal groups. Particularly valuable products are obtained when the copolymer is hydrolyzed to from 50 to 100 per cent of that theoretically possible and the hydrolyzed copolymer is acetalized, ketalized or acetalized and ketalized until from 50 to 100 per cent of the hydroxyl groups of the hydrolyzed copolymer have been replaced by the corresponding acetal, ketal or acetal and ketal groups.

Although it is possible to copolymerize (and thereafter hydrolyze and acetalize, ketalize or acetalize and ketalize) a vinyl ester and an unsaturated nitrile not containing a

grouping, for example compounds containing the grouping

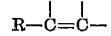

where R is an aliphatic or aromatic hydrocarbon radical, a specific example being crotonitrile, $CH_3-CH=CHCN$, the production of such copolymers requires the use of very strong polymerization catalysts, e. g., aluminum chloride, boron trifluoride, etc. Such copolymers are not entirely satisfactory as starting reactants and the reaction products of the same with a

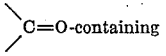

organic compound have relatively limited utility as compared with the acetals, ketals or acetals and ketals of hydrolyzed copolymers of a vinyl ester and a nitrile containing at least one

grouping.

In order that those skilled in the art better may understand how to practice this invention, the following more detailed description is given.

*Preparation of copolymer*

In effecting copolymerization between the vinyl ester and the unsaturated organic nitrile, the components are mixed and interpolymerized in the presence or absence of a polymerization catalyst, e. g., benzoyl peroxide in a concentration within the range of 0.1 to 2.0 per cent by weight of the whole, and at normal or at elevated temperatures, e. g., at from room temperature (20° to 30° C.) to 130° C. Ordinarily I use temperatures within the range of 60° to 120° C. in causing the mixed components to interpolymerize. Additional examples of polymerization catalysts which may be used are given in various copending applications of mine, for instance in copending application Serial No. 336,981, filed May 24, 1940, and assigned to the same assignee as the present invention.

Mainly for economic reasons I prefer to use not more than 50 per cent by weight (of the mixture) of the unsaturated organic nitrile in forming the copolymer reactant, and generally use less than 30 per cent, for example from 0.1 to 10 per cent. The particular proportions employed are dependent to a large extent upon the particular starting components and the particular properties desired in the finished product.

In certain cases, instead of copolymerizing a single vinyl ester with a single unsaturated organic nitrile, I may copolymerize a single vinyl ester with a plurality of such nitriles or a plurality of vinyl esters with a single or a plurality of unsaturated organic nitriles, more particularly unsaturated nitriles containing at least one $CH_2=C\diagup\diagdown$ grouping. Also, in some cases, one or more other organic materials that are copolymerizable with the vinyl ester (or esters) and the unsaturated nitrile (or nitriles) may be incorporated into the mixture and the whole copolymerized to form a copolymer reactant of improved utility in the production of an acetalized, ketalized or acetalized and ketalized copolymer of particular properties. Examples of such organic materials that may be used with the vinyl ester and the unsaturated organic nitrile in producing the copolymer are maleate esters, fumarate esters, vinyl ketones, acrylaldehydes, unsaturated ethers having at least one $CH_2=C\diagup\diagdown$ grouping, etc., more specific examples thereof being given in my various copending applications.

Illustrative examples of vinyl esters, in addition to those previously mentioned, that may be used in preparing the starting copolymer reactant, are the vinyl esters of saturated and unsaturated, aliphatic and aromatic, monobasic and polybasic acids, more specifically the vinyl esters of the following acids: chloroacetic, propionic, bromopropionic, butyric, isobutyric, valeric, caproic, heptylic, caprylic, nonylic, capric, acrylic, alkacrylic (e. g., methacrylic, ethacrylic, etc.), crotonic, oxalic, malonic, succinic, glutaric, adipic, pimelic, suberic, azelaic, sebacic, benzoic, toluic, phenyl acetic, phthalic, terephthalic, benzoyl phthalic, benzophenone-2,4'-dicarboxylic, cinnamic, tricarballylic, tartaric, citric, lactic, etc., including the alpha unsaturated alpha beta polycarboxylic acids, e. g., maleic, monohalomaleic, fumaric, monohalofumaric, citraconic, mesaconic, acetylene dicarboxylic, aconitic, itaconic, etc. Additional examples of vinyl esters that may be employed in preparing the copolymers are vinyl hexahydrobenzoate, vinyl propyl succinate, vinyl butyl phthalate, vinyl diethyl citrate, divinyl phthalate, trivinyl citrate, vinyl phenyl acetate, divinyl o-phenylene diacetate, divinyl phenyl butyrate o-carboxylate, trivinyl trimesate and vinyl-o-toluylate, the structural formulas of which are given in my above-identified copending application Serial No. 336,981.

In some cases it is of particular advantage in forming the copolymer to use vinyl esters having a plurality of polymerizable groupings, specifically those containing a

grouping and at least one other polymerizable grouping, e. g., another

grouping. Numerous examples of such vinyl esters have been given above. Thermoplastic copolymers may be obtained, for example, by copolymerizing a vinyl ester containing a single

grouping with an unsaturated nitrile also containing a single

grouping. By controlling the extent of hydrolysis and acetalization, ketalization or acetalization and ketalization of such thermoplastic copolymers, products varying from soft, thermoplastic (heat-softening) to hard, semi-thermoplastic solids may be produced. By copolymerizing a vinyl ester containing a single or a plurality of

groupings with an unsaturated nitrile containing a

grouping and at least one other polymerizable grouping, e. g., another

grouping, non-thermoplastic copolymers result. When such copolymers are acetalized, ketalized or acetalized and ketalized semi-thermoplastic products capable of being shaped under heat and pressure are obtained.

Illustrative examples of nitriles containing at least one

grouping, in addition to those previously mentioned, and which may be employed in preparing the starting copolymer reactant, are:

Beta-vinyl acrylonitrile

Vinyl acetonitrile

Vinyl dimethyl acetonitrile

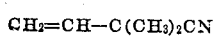

Alpha-brom acrylonitrile

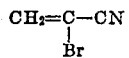

Allyl acetonitrile

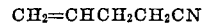

Alpha-ethyl acrylonitrile

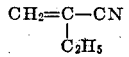

Meta-vinyl benzonitrile

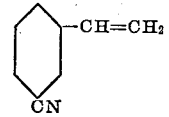

Ortho-vinyl phenyl acetonitrile

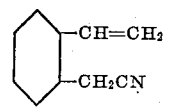

Atropic nitrile

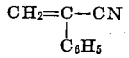

Phenyl allyl acetonitrile

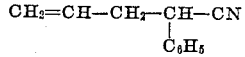

*Treatment of copolymer*

In preparing the acetalized, ketalized or acetalized and ketalized interpolymers of this invention, I conduct the acetalization, ketalization or acetalization and ketalization reaction, under acid conditions, simultaneously with the hydrolysis of the copolymer. This may be done, for example, by treating the copolymer with water, an acidic catalyst (e. g., mineral acids such as hydrochloric, sulfuric, etc., and acidic salts such as aluminum chloride, zinc chloride, etc.) and an organic compound (or compounds) containing or engendering an active carbonyl

grouping, e. g., an aldehyde, a ketone, a mixture of different ketones, a mixture of different aldehydes, or a mixture of one or more aldehydes and one or more ketones. The acetalization, ketalization or acetalization and ketalization reaction is continued until the desired percentage of hydroxyl groups in the hydrolyzed copolymer have been replaced by the corresponding acetal, ketal or acetal and ketal groups. The solid reaction product then is isolated from the reaction mass, washed and dried. Preferably the reaction is carried out in the presence of a liquid medium adapted to cause a molecular dispersion of the reaction product, e. g., in acetic acid, propionic acid, liquid (or liquefiable) monohydric alcohols, e. g., ethyl alcohol, butyl alcohol, amyl alcohol, etc. To shorten the time required for treating the copolymer, it is desirable to maintain the reactants at an elevated temperature, say 60° to 100° C. or above, the exact temperature depending more or less upon the boiling point of the mixture. Ordinarily the reaction is carried out under reflux at or approaching the boiling point of the reaction mass.

After the conjoint hydrolysis and acetalization, ketalization or acetalization and ketalization reaction has been carried to the desired stage as determined by anlysis or by previous experience, the reaction mass usually is mixed with water to which may be added, if desired, a neutralizing agent (e. g., sodium and potassium hydroxides and carbonates, ammonium hydroxide, etc.) for the acidic bodies. This causes coagulation of the treated copolymer, which thereafter is washed until free from water-soluble materials and then dried. The resulting products may be shaped by the application of heat, pressure or heat and pressure.

As >C=O-containing organic compounds that are caused to react with the copolymer I may use any aldehyde or ketone or any compound engendering an aldehyde or a ketone during the reaction between the starting components. Examples of such compounds are formaldehyde, paraformaldehyde, paraldehyde, trioxymethylene, acetaldehyde, propionaldehyde, butyraldehyde, acrolein, methacrolein, crotonaldehyde, benzaldehyde, cinnamic aldehyde, anisaldehyde, p-methoxy phenyl acetaldehyde, furfural, acetone, chloroacetone, methylvinyl ketone, divinyl ketone, methyl ethyl ketone, acetophenone, benzophenone, quinone, tetrahydroquinone, benzil, benzoyl acetone, acetyl dibenzoyl methane, benzal acetophenone, mesityl oxide, shogaol, cyclohexanone, vanillin, zingerone, alpha-oxy-tetrahydronaphthalene, paeonol, etc.

The properties, for example hardness, of the final product are considerably influenced by the particular >C=O-containing compound used. Thus, for the same copolymer and the same degree of hydrolysis and acetalization, formaldehyde will yield a harder acetalized copolymer than propionaldehyde. On the other hand, acrolein and furfural yield more solvent-resistant copolymers than formaldehyde. Mixtures of different aldehydes or of different ketones or of aldehydes and ketones may be used in certain cases to impart particular properties to the final product. In such modifications, the hydrolysis and condensation with the mixed >C=O-containing compounds may be carried out simultaneously, or simultaneous hydrolysis and partial acetalization, ketalization or acetalization and ketalization with one treating agent (>C=O-containing organic compound) may be caused to take place, followed by more complete reaction with a different >C=O-containing organic compound.

The properties of the final product depend upon many factors, one of which is the composition of the starting copolymer reactant. The concentration of the polymerization catalyst and the temperature of polymerization used in the production of the copolymer reactant also influence the properties of the final product. High catalyst concentration and (or) high polymerization temperatures yield copolymers of lower molecular weight than result from lower amounts of catalyst and (or) lower polymerization temperatures. These differences are reflected in the reaction products of the copolymer with the >C=O-containing compound.

The extent of hydrolysis and acetalization, ketalization or acetalization and ketalization of the copolymer may be varied by varying, for example, the time and temperature of reaction and the concentration of the catalytic agent and of the >C=O-containing compound.

The properties of the final product also may be varied by varying the extent of hydrolysis, the extent of the reaction with the >C=O-containing compound, and the ratio of hydroxyl groups to substituent groups and the ratio of each to the number of ester groups remaining in the molecule. For example, two products with entirely different properties will result from the same copolymer reactant if, in one case, the hydrolysis is carried to 90 per cent of that theoretically possible and then 45 per cent of the available hydroxyl groups are acetalized, ketalized or acetalized and ketalized, while in the other case the hydrolysis is carried to 45 per cent of that theoretically possible and then 90 per cent of the available hydroxyl groups are acetalized, ketalized or acetalized and ketalized. This will be understood more clearly from a consideration of Fig. 1 of the accompanying drawing showing a triangular coordinate graph and from the following discussion of the same.

The point F on this graph designates the starting copolymer which is 100 per cent non-hydrolyzed and non-acetalized, that is, a copolymer which has not been hydrolyzed and has not been treated with a >C=O-containing compound; the point E designates a 100 per cent hydrolyzed copolymer; and the point A, a 100 per cent acetalized, ketalized or acetalized and ketalized copolymer. The area I, designated by the triangle ABC, covers compositions of particular utility in the production of molding compositions and electrically insulating materials. Those compositions within this area which contain less than 20 per cent of hydroxyl groups, of the maximum theoretically possible on complete hydrolysis, are particularly useful in the production of wire enamels. The area II, designated by the triangle CDF, covers compositions having properties more closely approaching those of the starting copolymer reactant than those compositions covered by areas I, III and IV. The area III, designated by the triangle BED, covers compositions of lesser resistance to water than the compositions of the other areas. This is because of their higher hydroxyl content as compared with the other compositions. These compositions are more easily dispersed in water. They are particularly adapted for use in the production of water-dispersible and hydroxylated-solvent-dispersible adhesives. The area IV, designated by the triangle BCD (middle section of the graph) covers compositions having properties intermediate to those falling within the other areas. The properties of any particular composition falling within this area approach those of the compositions falling within the area to which it is nearest.

It will be understood, of course, that the deductions which may be made from this graph are only general and that other variable influences in the production of the treated copolymer may cause some variations. The graph, however, does show the wide variations that are possible in the production of the new synthetic compositions of this invention and, in a general way, how the properties of the final product may be varied by varying the extent of hydrolysis and the extent of the reaction with the

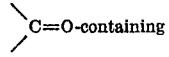

compound.

The properties of these new artificial masses may be varied in still other ways. For example, their properties may be varied by carrying out the conjoint hydrolysis and reaction with the

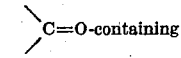

compound in the presence of other reactants such, for instance, as one or more organic compounds capable of reacting, more particularly condensing, with the

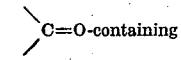

compound or with the reaction product of the

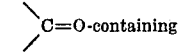

compound and the hydrolyzed copolymer. Examples of such modifying reactants that may be used as such, or in the form of their methylol or methylene derivatives, are phenols, including halogenated (e. g., chlorinated, brominated, etc.) and non-halogenated monohydric and polyhydric phenols, e. g., phenol itself and its homologues such as ortho, meta and para cresols, the xylenols, the butyl, amyl and hexyl phenols, tertiary amyl phenol, cyclohexyl phenol, phenyl phenol, styryl (1-phenethyl) phenols, indene phenol, coumar phenol, resorcinol, chlorophenol, chlorophenyl phenol, chlorophenalkyl phenols, etc.; hydroxy aromatic esters, e. g., hydroxy benzoates, hydroxy phenyl acetates, hydroxy phenyl propionates, hydroxy cinnamates, etc.; hydroxy aromatic ethers, e. g., hydroquinone mono-ethers, guaiacols, etc.; monohydric and polyhydric alcohols, e. g., ethyl propyl, isopropyl, butyl, amyl, etc., alcohols, ethylene glycol, diethylene glycol, glycerine, pentaerythritol, trimethylol nitro methane, etc.; amides, both monoamides and polyamides, e. g., formamide, acetamide, stearamide, malonic diamide, succinic diamide, adipic diamide, phthalic diamide, citric triamide, itaconic diamide, sulfonamides such as toluene sulfonamide, benzamide, urea and its homologues and derivatives and substances of the nature of urea, e. g., thiourea, methyl urea, tertiary amyl urea, phenyl thiourea, guanidine, biguanide, guanyl urea, pseudothiourea triazines, e. g., melamine, etc.; amines, e. g., ethylene diamine, aniline, phenylene diamine, amino phenols, etc. Of course other organic compounds that are reactable, specifically condensable, with a

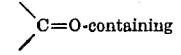

compound selected from the class consisting of aldehydes, ketones and mixtures of aldehydes and ketones also may constitute the modifying reactant.

The following specific examples are given in order to illustrate more clearly how the present invention may be carried into effect. All parts are by weight.

*Example 1*

Seventeen parts of a thermoplastic copolymer of 80 parts vinyl acetate and 20 parts acrylonitrile were reacted for 144 hours at 70° C. and for an additional 96 hours at 100° C. with

|  | Parts |
|---|---|
| Aqueous formaldehyde (approximately 37.1% HCHO) | 10 |
| Concentrated hydrochloric acid | 1 |
| Acetic acid | 100 |

This yielded a yellow solution containing some lumps of insoluble, acetalized interpolymer. The entire mass was poured into water containing sufficient ammonia to neutralize the mineral acid. This caused precipitation of the portion of the acetalized interpolymer which was soluble or dispersed in the solution, and a breaking down of the lumps. Washing and drying of the granular precipitate thus obtained gave a very hard, tough, amber-colored resin. This resin was harder than the original copolymer, but was still thermoplastic. It knitted together with difficulty when heated at 150° C. but fused at temperatures of the order of 175° C. It can be molded under pressure, with or without dyes, fillers, pigments, etc., into a variety of shapes at temperatures of 150° to 200° C.

*Example 2*

The copolymer and conditions of treatment were the same as in Example 1, the other reactants being

|  | Parts |
|---|---|
| Acetone | 8 |
| Water | 5 |
| Concentrated hydrochloric acid | 1 |
| Acetic acid | 100 |

This also resulted in a yellow solution containing some lumps of insoluble, ketalized copolymer. Treatment of this solution as in Example 1 gave a hard, white resin that knitted together with difficulty at 150° C., but readily at 175° C.

*Example 3*

The copolymer and the reaction conditions were the same as in Example 1. The other reactants, however, were as follows:

|  | Parts |
|---|---|
| Aqueous formaldehyde (approximately 37.1% HCHO) | 18 |
| Phenol | 9 |
| Concentrated hydrochloric acid | 1 |
| Acetic acid | 100 |

This yielded a solution containing some lumps (also a precipitate) of insoluble material. Prolonged heating of this material at 80° to 100° C. gave a solid resin that did not soften when heated at 150° C.

In the following examples fifty parts of a copolymer of 90 parts vinyl acetate and 10 parts acrylonitrile were reacted with the reactants mentioned in the individual example for 24 hours at 80° C. and for 48 hours more at 70° C.

Example 4

| | Parts |
|---|---|
| Vinyl acetate-acrylonitrile copolymer | 50 |
| Aqueous formaldehyde (approximately 37.1% HCHO) | 28 |
| Concentrated sulfuric acid | 2.5 |
| Acetic acid | 250 |

At the end of the reaction period an opalescent, straw-colored, viscous solution containing very soft, swelled lumps of insoluble, acetalized copolymer was obtained. Precipitation, washing and drying yielded a horny, light-colored thermoplastic resin.

Example 5

| | Parts |
|---|---|
| Vinyl acetate-acrylonitrile copolymer | 50 |
| Butanol (butyraldehyde) | 25 |
| Water | 20 |
| Concentrated sulfuric acid | 2.5 |
| Acetic acid | 250 |

The product of reaction was a viscous, purple solution containing swelled lumps of insoluble, acetalized copolymer. After precipitation, washing and drying, a light amber, horny thermoplastic resin was obtained.

Example 6

| | Parts |
|---|---|
| Vinyl acetate-acrylonitrile copolymer | 50 |
| Chloroacetone | 32 |
| Water | 20 |
| Concentrated sulfuric acid | 2.5 |
| Acetic acid | 250 |

Heating the above components under the described time and temperature conditions gave a viscous, straw-colored solution containing swelled lumps of insoluble, ketalized copolymer. Precipitation, washing and drying yielded a hard, cream-colored, thermoplastic resin.

Example 7

| | Parts |
|---|---|
| Vinyl acetate-acrylonitrile copolymer | 50 |
| Aqueous formaldehyde (approximately 37.1% HCHO) | 56 |
| Ethyl p-hydroxy benzoate | 48 |
| Concentrated sulfuric acid | 2.5 |
| Acetic acid | 250 |

A viscous, straw-colored solution containing swelled lumps of insoluble, acetalized copolymer was obtained at the end of the reaction period. A fairly elastic, cream-colored thermoplastic resin was obtained from this solution after precipitating, washing and drying.

Example 8

| | Parts |
|---|---|
| Vinyl acetate-acrylonitrile copolymer | 50 |
| Butanol | 50 |
| Para-chlor-meta-cresol | 42 |
| Water | 20 |
| Concentrated sulfuric acid | 2.5 |
| Acetic acid | 250 |

This resulted in a very viscous, black solution containing swelled, acetalized copolymer. After precipitation, washing and drying, a black, rubbery, thermoplastic resin was obtained.

Example 9

| | Parts |
|---|---|
| Vinyl acetate-acrylonitrile copolymer | 50 |
| Aqueous formaldehyde (approximately 37.1% HCHO) | 56 |
| Para-tertiary butyl phenol | 45 |
| Concentrated sulfuric acid | 2.5 |
| Acetic acid | 250 |

At the end of the reaction period a viscous, straw-colored solution containing swelled lumps of insoluble, acetalized copolymer was obtained. Precipitation, washing and drying gave a hard, white thermoplastic resin.

Example 10

| | Parts |
|---|---|
| Vinyl acetate-acrylonitrile copolymer | 50 |
| Aqueous formaldehyde (approximately 37.1% HCHO) | 56 |
| Acetamide | 34 |
| Concentrated sulfuric acid | 2.5 |
| Acetic acid | 250 |

After reacting the above components under the previously described time and temperature conditions, a viscous, straw-colored solution containing swelled lumps of insoluble, acetalized copolymer was obtained. Precipitation, washing and drying yielded a hard, white, thermoplastic resin.

Example 11

| | Parts |
|---|---|
| Vinyl acetate-acrylonitrile copolymer | 50 |
| Butanol | 50 |
| Water | 20 |
| Urea | 18 |
| Concentrated sulfuric acid | 2.5 |
| Acetic acid | 250 | were reacted as above described to yield a viscous, amber-red solution containing swelled lumps of insoluble, acetalized copolymer. After precipitation, washing and drying, a horny, light-amber, thermoplastic resin was obtained.

The fundamental synthetic compositions of this invention may be varied widely by introducing various modifying bodies during or after the reaction of the hydrolyzed copolymer with the $$\diagdown C=O\text{-containing}$$

compound. These modifying bodies may take the form of high molecular weight bodies with or without resinous characteristics, for example, hydrolyzed wood products, lignin, proteins, protein-aldehyde condensation products, furfural condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc., polyvinyl compounds such as polyvinyl alcohol, polyvinyl acetate, polyvinyl acetals, specifically polyvinyl formal, synthetic linear condensation products such as the superpolyamides, etc.

Other modifying bodies of a plasticizing or softening nature also may be suitably incorporated into the fundamental synthetic materials of this invention. Examples of such modifying agents are the phthalate esters, for instance dimethyl phthalate, diethyl phthalate, dibutyl phthalate, etc.; the phosphate esters, e. g., tricresyl phosphate, triphenyl phosphate, etc.; glycol di-esters, e. g., glycol di-hexoate, glycol acetate hexoate, glycol acetate, benzoate, glycol di-acetoacetate, etc.; esters of furfuryl and tetrahydrofurfuryl alcohols, e. g., furfuryl and tetrahydrofurfuryl maleates, itaconates, fumarates, salicylates, phthalates, etc.; the amide esters of alkanol amines, e. g., esters corresponding to the structural formulas $$RCONHCR_2CR_2OCOR, RCON(CR_2CR_2OCOR)_2$$

and $$N(CR_2CR_2OCOR)_3$$

in which formulas R represents hydrogen, alkyl or aryl radicals; the semi-amides of polyesters, e. g., semi-amides corresponding to the structural formulas

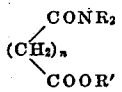

and

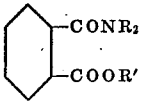

in which formulas $n$ represents 1 or more, R represents hydrogen, alkyl or aryl radicals and R' represents alkyl or aryl radicals; imides, e. g., succinimide, phthalimide, etc.; and similar substances.

The products of this invention may be stabilized against discoloration and made more resistant to decomposition under heat, particularly in the presence of air, by incorporating into the reaction mass or into the intermediate or finished products various inhibiting or stabilizing agents. Examples of such agents which may be used are phenolic bodies, e. g., phenol, resorcinol, catechol, hydroquinone, pyrogallol, phloroglucinol, alpha- and beta-naphthols, cresols, xylenols, carvacrol, thymol, para-tertiary butyl phenol, para-tertiary amyl phenol, para-phenyl phenol, etc.; amines, e. g., ethyl, propyl, butyl and amyl amines and higher members of the homologous series, methyl amyl, ethyl hexyl, iso-propyl butyl amines, etc., alkanol amines, e. g., mono-, di- and tri-ethanol amines, etc., poly-amines, e. g., ethylene diamine, tri- and tetra-methylene diamines, etc., aromatic primary, secondary and tertiary amines, e. g., phenyl, naphthyl, naphthyl phenyl amines and substitution products of such amines, e. g., benzyl amine, ethyl naphthyl amine, diphenyl methyl amine, etc.; amides, e. g., acetamide, benzamide, toluene sulfonamide, succinic diamide, etc.; reaction products of phenols, of amines and of amides, e. g., phenol-aldehyde condensation products, amide-aldehyde condensation products, amine-aldehyde condensation products; and similar substances. The chosen stabilizer (inhibitor) depends largely upon the particular service application of the finished product. Any suitable amount of stabilizer may be used, but ordinarily only a relatively small proportion, for example from about 0.1 to 3.0 per cent by weight of the acetalized, ketalized or acetalized and ketalized interpolymer is employed.

Dyes, pigments and opacifiers (e. g., barium sulfate, zinc sulfide, titanium compounds such as the oxides, flaked aluminum, copper and the like) may be incorporated into the compositions to alter the visual appearance and the optical properties of the finished product. Mold lubricants such as the metallic soaps of the high molecular weight fatty acids, for example the stearates and palmitates of tin, zinc, calcium, cadmium, etc., waxes such as carnauba, high melting point paraffin waxes, etc., may be added to facilitate molding of the compositions. Various fillers may be used to provide a wide variety of molding compositions. The particular filler depends upon the particular application for which the molded article is employed. As fillers may be used, for instance, bleached or unbleached wood flour, alpha cellulose in flock form, sheets or cuttings of paper, cloth, canvas, etc., asbestos in powdered or long or short fiber length including defibrated asbestos, powdered or flaked mica, wood chips, short or long wood fibers, synthetic or natural continuous threaded fibers, glass fibers in continuous filament or fabric (woven or felted) form, etc. The filled or unfilled synthetic compositions may be densified by working in a Banbury mixer, or by rolling, pelleting or other means, followed by grinding and screening to the desired particle size. The molding compositions may be molded, extruded or injected at elevated temperatures, e. g., 125° to 225° C. and at suitable pressures, e. g., at about 1000 to 20,000 pounds per square inch, usually between about 2000 and 4000 pounds per square inch in compression molding.

In addition to their use in molding compositions and in the production of molded articles, these new plastic compositions may be dissolved or dispersed in solvents or swelling agents, e. g., dioxane, furfural, furfuryl alcohol, phenol, cresols, phenol alcohols, oxygenated solvents such as ketones, liquid aliphatic acids and alcohols, or in mixtures of such materials, to form liquid coating and impregnating compositions. Such liquid compositions also may contain oils, e. g., linseed oil, Chinawood oil, perilla oil, soya bean oil, etc., pigments, plasticizers, driers, and other addition agents commonly used in the production of paints, varnishes, lacquers, enamels, etc. Coating compositions made from these new synthetic materials (particularly those which are highly acetalized, ketalized or acetalized and ketalized), when applied to a base member, e. g., metals, and air-dried or baked, are strong, tough, abrasion-resistant, have good adhesive properties and excellent resistance to heat, water and organic solvents.

As illustrative of how the synthetic compositions of this invention may be used in the field of electrical insulation, the following examples are cited:

A liquid coating composition comprising an acetalized, a ketalized or an acetalized and ketalized interpolymer of the kind above described and a suitable volatile solvent is applied to a metallic conductor such as plain or tinned copper wire, for example by passing the wire through a bath of the coating composition. Thereafter the coated wire is passed through a suitably heated oven to vaporize the solvent and to convert the coating to a hard, tough, flexible, abrasion-, moisture- and solvent-resistant state. In some cases it may be desirable to wrap the conductor with a fibrous material, e. g., asbestos in defibrated or other form or with glass fibers, cotton cloth, paper, etc., before treating it with the solution. A further procedure is to coat and at least partly impregnate the wrapped conductor with a syrupy solution of the treated interpolymer, wind the thus insulated conductor into the desired coil, and then heat the wound coil to evaporate the solvent and to harden the residual product.

Sheet insulation may be prepared by treating woven or felted organic or inorganic fabrics or paper with these new synthetic materials. Sheet insulation also may be prepared by binding together flaky inorganic substances with the acetalized interpolymers of this invention. For example, mica flakes may be cemented and bonded together with an acetalized, ketalized or an acetalized and ketalized interpolymer to form laminated mica products.

In addition to their use as electrically insulating materials the products of this invention have a wide variety of other applications. For instance, they may be used in the production of so-called "safety glass," wherein superimposed layers of glass are firmly united with a binder comprising one or more of these new synthetic compositions. Particularly suitable for such applications are organic plastic materials produced by reaction of butyraldehyde with a hydrolyzed copolymer of vinyl acetate and an organic nitrile containing a single

grouping or an organic nitrile containing a plurality of polymerizable groupings at least one of which is a

grouping. In such plastic materials the hydroxyl groups of the hydrolyzed copolymer are replaced by butyral groups.

The modified or unmodified products of this invention have a wide variety of other uses, for instance in making interior finishing and construction materials for homes, offices, etc., particularly where high-impact-strength and shock-resistant structures are desired. They also may be molded or otherwise suitably shaped to produce buttons, clock cases, radio cabinets, household utensils, decorative novelties, etc. Some of the synthetic compositions of this invention are fiber-forming, that is, they can be drawn into continuous filaments. Such filaments may be made into felted or woven fabrics. The highly acetalized, ketalized or acetalized and ketalized interpolymers are especially adapted for use as water repellents and sizings when applied to wood or the like, or to fibrous materials such as silk, cotton, wool, synthetic organic fibers, etc., in continuous filament, fabric or other form. The synthetic materials of this invention also may be used in making laminated fibrous sheet materials wherein superimposed layers of cloth, paper, etc., are firmly bonded together with the synthetic material; as impregnants for electrical coils and other electrical devices; in the construction of electric circuit interrupters; as insulation for motors, generators and other dynamo-electric machines, e. g., as insulation for the coil windings, as slot insulation, in the form of sleevings over electrical connections, in sheet form as separators between running and starting coil windings, etc.

Figure 2:
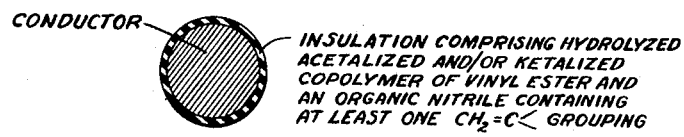

Fig. 2 of the drawing is a cross sectional view of an electrical conductor provided with insulation comprising synthetic compositions of the character described and claimed herein.

What I claim as new and desire to secure by Letters Patent of the United States is:

1. The process of preparing new synthetic compositions which comprises hydrolyzing a copolymer of a plurality of copolymerizable materials including (1) a vinyl ester and (2) an organic nitrile copolymerizable with the said ester, said nitrile containing a

grouping, and simultaneously with the hydrolysis reaction causing the hydrolyzed copolymer to react with a

organic compound selected from the class consisting of aldehydes, ketones and mixtures of aldehydes and ketones.

2. The process of preparing new synthetic compositions which comprises hydrolyzing a copolymer of a plurality of copolymerizable materials, one of which is a vinyl ester and another of which is a nitrile containing a

grouping, and simultaneously with the hydrolysis reaction acetalizing the hydrolyzed copolymer until at least some of the hydroxyl groups of the hydrolyzed copolymer have been replaced by acetal groups.

3. The process of preparing new synthetic compositions which comprises partially hydrolyzing a copolymer of a plurality of copolymerizable materials including (1) a vinyl ester and (2) a nitrile containing a

grouping, and simultaneously with the hydrolysis reaction acetalizing the partially hydrolyzed copolymer until at least 50 per cent of the hydroxyl groups of the hydrolyzed copolymer have been replaced by acetal groups.

4. The process of preparing new synthetic compositions which comprises partially hydrolyzing a copolymer of a plurality of copolymerizable materials, one of which is a vinyl ester and another of which is a nitrile containing a single

grouping, and simultaneously with the hydrolysis reaction ketalizing the partially hydrolyzed copolymer until at least 50 per cent of the hydroxyl groups of the hydrolyzed copolymer have been replaced by ketal groups.

5. The process of preparing new synthetic compositions which comprises forming a copolymer of a plurality of copolymerizable materials including (1) a vinyl ester and (2) a nitrile containing a

grouping, hydrolyzing the said copolymer to at least 10 per cent of that theoretically possible, and simultaneously with the hydrolysis reaction acetalizing the hydrolyzed copolymer until at least 10 per cent of its hydroxyl groups have been replaced by acetal groups.

6. The process of preparing new synthetic compositions which comprises hydrolyzing, to from 25 to 100 per cent of that theoretically possible, a copolymer of (1) at least one vinyl ester and (2) at least one nitrile containing a $CH_2=C\Big\langle$ grouping, and simultaneously with the hydrolysis reaction acetalizing the hydrolyzed copolymer until at least 50 per cent of its hydroxyl groups have been replaced by acetal groups.

7. A process as in claim 6 wherein the hydrolyzed copolymer is acetalized until from 60 to 100 per cent of its hydroxyl groups have been replaced by acetal groups.

8. A process as in claim 6 wherein the copolymer is hydrolyzed to from 50 to 100 per cent of that theoretically possible and the hydrolyzed copolymer is acetalized until from 75 to 100 per cent of its hydroxyl groups have been replaced by acetal groups.

9. The process of preparing new synthetic compositions which comprises reacting the components of a mass comprising (1) a

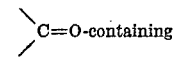organic compound selected from the class consisting of aldehydes, ketones and mixtures of aldehydes and ketones and (2) a hydrolyzed copolymer of vinyl acetate and a nitrile containing a

grouping, said reaction being carried out simultaneously with hydrolysis of the copolymer in a liquid medium and in the presence of an acid catalyst until at least 50 per cent of the hydroxyl groups of the hydrolyzed copolymer have been replaced by the corresponding acetal, ketal or acetal and ketal groups, and isolating the solid reaction product from the reaction mass.

10. A composition comprising the product obtained by conjoint hydrolysis and reaction with a

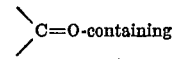organic compound of a copolymer of a plurality of copolymerizable materials, one of which is a vinyl ester and another of which is an organic nitrile copolymerizable with the said ester, said nitrile containing a

grouping and said

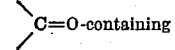compound being selected from the class consisting of aldehydes, ketones and mixtures of aldehydes and ketones.

11. An organic plastic material obtained by conjoint hydrolysis and acetalization of a copolymer of a plurality of copolymerizable materials including (1) at least one vinyl ester and (2) at least one nitrile containing a

grouping.

12. A composition comprising the resinous product of reaction of ingredients comprising (1) a copolymer of a plurality of copolymerizable materials including a vinyl ester and a nitrile that contains a

grouping, and (2) a

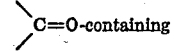organic compound selected from the class consisting of aldehydes, ketones and mixtures of aldehydes and ketones, the reaction between the ingredients of (1) and (2) being carried out simultaneously with the hydrolysis of the said copolymer.

13. A composition comprising the product of conjoint hydrolysis and acetalization of a copolymer of a vinyl ester having a plurality of polymerizable groupings and a nitrile containing a

grouping.

14. A composition comprising the product of conjoint hydrolysis and formalization of a copolymer of vinyl acetate and a nitrile containing a

grouping.

15. A plastic composition obtained by hydrolyzing a copolymer of vinyl acetate and a nitrile containing a

grouping, and simultaneously with the hydrolysis reaction causing the said copolymer to react with butyraldehyde.

16. A composition comprising the product of conjoint hydrolysis and acetalization of a copolymer of vinyl acetate and acrylonitrile.

17. An organic plastic material comprising a plasticized product of conjoint hydrolysis and butyralization of a copolymer of vinyl acetate and acrylonitrile, said product having at least 50 per cent of its hydroxyl groups replaced by butyral groups.

18. A synthetic composition comprising the product of conjoint hydrolysis and acetalization of a copolymer of vinyl acetate and methacrylonitrile.

19. An insulated electrical conductor comprising a metallic conductor and insulation thereon comprising the product obtained by conjoint hydrolysis and reaction with a

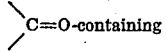organic compound of a copolymer of a plurality of copolymerizable materials, one of which is a vinyl ester and another of which is an organic nitrile copolymerizable with the said ester, said nitrile containing a

grouping and said

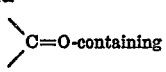compound being selected from the class consisting of aldehydes, ketones and mixtures of aldehydes and ketones.

GAETANO F. D'ALELIO.

CERTIFICATE OF CORRECTION.

Patent No. 2,332,899.   October 26, 1943.

GAETANO F. D'ALELIO.

It is hereby certified that error appears in the printed specification of the above numbered patent requiring correction as follows: Page 4, second column, line 74, for "anlysis" read --analysis--; page 7, first column, line 18 and line 59, and second column, line 24, for "Butanol" read --Butanal--; and that the said Letters Patent should be read with this correction therein that the same may conform to the record of the case in the Patent Office.

Signed and sealed this 4th day of January, A. D. 1944.

Henry Van Arsdale,
Acting Commissioner of Patents.

(Seal)